(12) United States Patent
Dai

(10) Patent No.: US 7,969,726 B2
(45) Date of Patent: Jun. 28, 2011

(54) FIXING MECHANISM FOR STORAGE DEVICE

(75) Inventor: Bin Dai, Shenzhen (CN)

(73) Assignees: Hong Fu Jin Preision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 0 days.

(21) Appl. No.: 12/542,830

(22) Filed: Aug. 18, 2009

(65) Prior Publication Data

US 2010/0246116 A1   Sep. 30, 2010

(30) Foreign Application Priority Data

Mar. 26, 2009 (CN) .............................. 200910301158

(51) Int. Cl.
*H05K 5/00* (2006.01)
*H05K 7/00* (2006.01)
*H01R 15/62* (2006.01)
*H01R 13/66* (2006.01)

(52) U.S. Cl. ......... 361/679.37; 361/679.33; 361/679.34; 361/679.35; 361/679.36; 312/332.1; 312/333; 439/327; 439/328; 439/151

(58) Field of Classification Search .. 361/679.31–679.4, 361/679.55–679.6, 724–727; 312/223.1, 312/223.2; 211/26; 439/60, 151–160, 327, 439/328, 331; 165/104.33; 29/37
See application file for complete search history.

(56) References Cited

U.S. PATENT DOCUMENTS

| | | | |
|---|---|---|---|
| 7,345,237 B2* | 3/2008 | Chen et al. | 174/50 |
| 7,575,453 B2* | 8/2009 | Lee et al. | 439/159 |
| 2004/0104184 A1* | 6/2004 | Hartman et al. | 211/26 |
| 2006/0171109 A1* | 8/2006 | Chang | 361/685 |
| 2007/0236878 A1* | 10/2007 | Lin et al. | 361/684 |

* cited by examiner

*Primary Examiner* — Robert J Hoffberg
*Assistant Examiner* — Jerry Wu
(74) *Attorney, Agent, or Firm* — Clifford O. Chi

(57) ABSTRACT

A fixing mechanism is used to fix a storage device to an electronic device. The electronic device includes a bracket. The fixing mechanism includes two latching members fixed to one of the bracket and the storage device, and a limiting member fixed to the other. The limiting member includes two side plates and at least one resilient hook. Each of the side plates defines a holding portion to receive the latching member. The at least one resilient hook engages with the latching members. The storage device may be secured by the fixing mechanism, or detached from the fixing mechanism depending on the resilient deformation or reformation of the resilient hooks.

14 Claims, 8 Drawing Sheets

FIXING MECHANISM FOR STORAGE DEVICE

BACKGROUND

1. Technical Field

The present disclosure relates to fixing mechanisms, and particularly, to a fixing mechanism for a storage device.

2. Description of the Related Art

Electronic devices, such as a typical desktop computer and server, usually include storage devices, such as hard disk drives, compact disk read-only memory (CD-ROM) drives, digital video disc (DVD) drives, and floppy disk drives. These electronic devices are typically added to increase the functionality of the electronic device as desired.

A typical fixing mechanism mounts a storage device to an electronic device. The electronic device, such as a host computer, includes a case having a base and a sidewall. The fixing mechanism includes a storage device holder, a fixing bracket, and a plurality of screws. The bracket is perpendicularly fixed to the base of the housing, and is separate from the sidewall. The storage device holder includes a mounting protrusion extending from a side surface thereof. The storage device holder is disposed on the base and the mounting protrusion is fixed to the bracket by the screws. The storage device is fixed in the storage device holder. However, with advancing development, many electronic devices have a relatively thinner profile. Sufficient space to disassemble the storage device with a screwdriver may not be provided, rendering disassembly of the storage device troublesome, and increasing a risk of damaging other working elements of the electronic device during such process.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
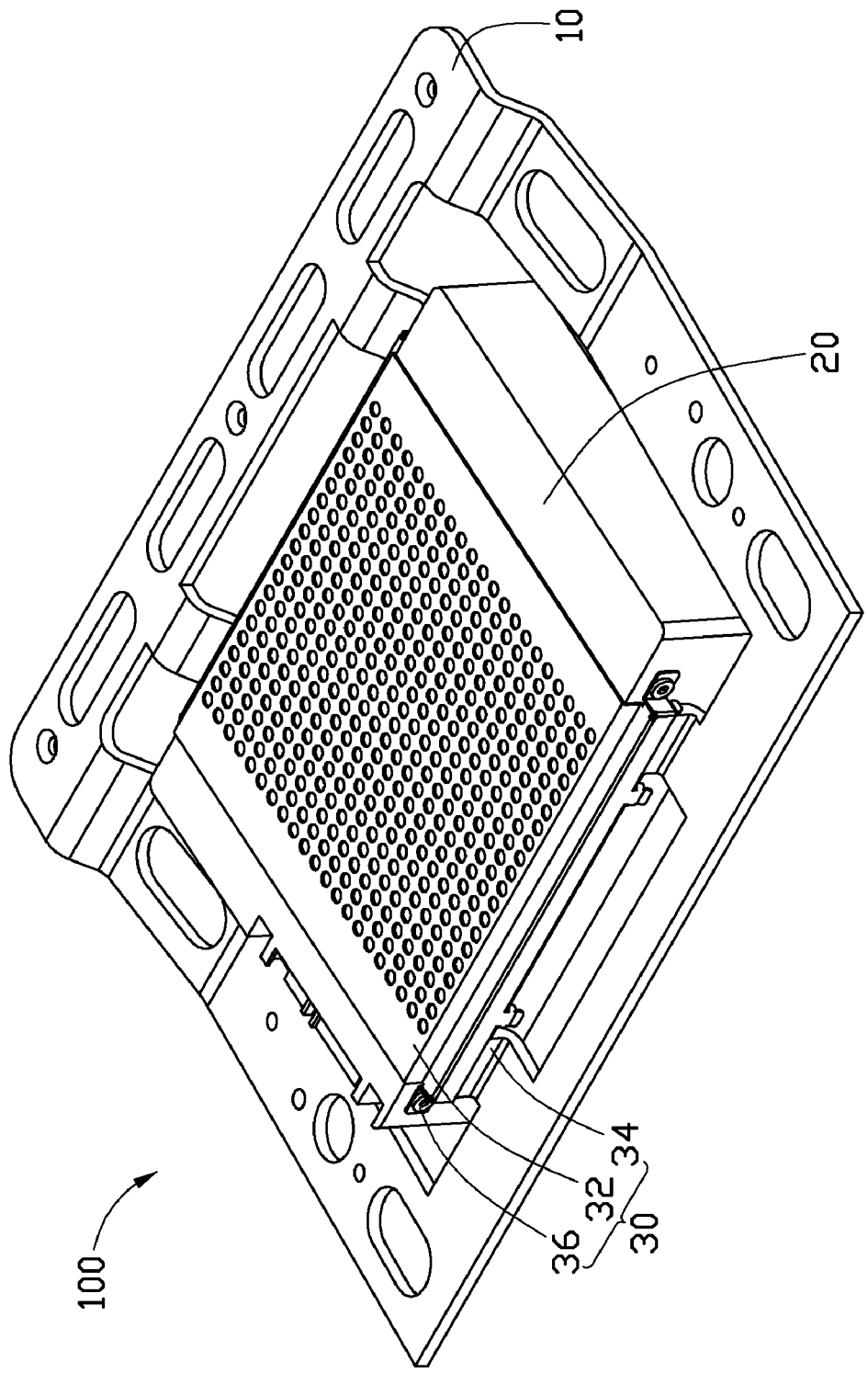
FIG. 1 is an isometric view of a first embodiment of a fixing mechanism.

Referring to FIG. 1, a first embodiment of an electronic device 100 includes a bracket 10, a storage device 20, and one embodiment of a fixing mechanism 30 to fix the storage device 20 to the bracket 10. In the illustrated embodiment, the electronic device 100 is a host computer, but can be any device having a storage device, such as a television set, handheld game console, and so on.

Figure 3:
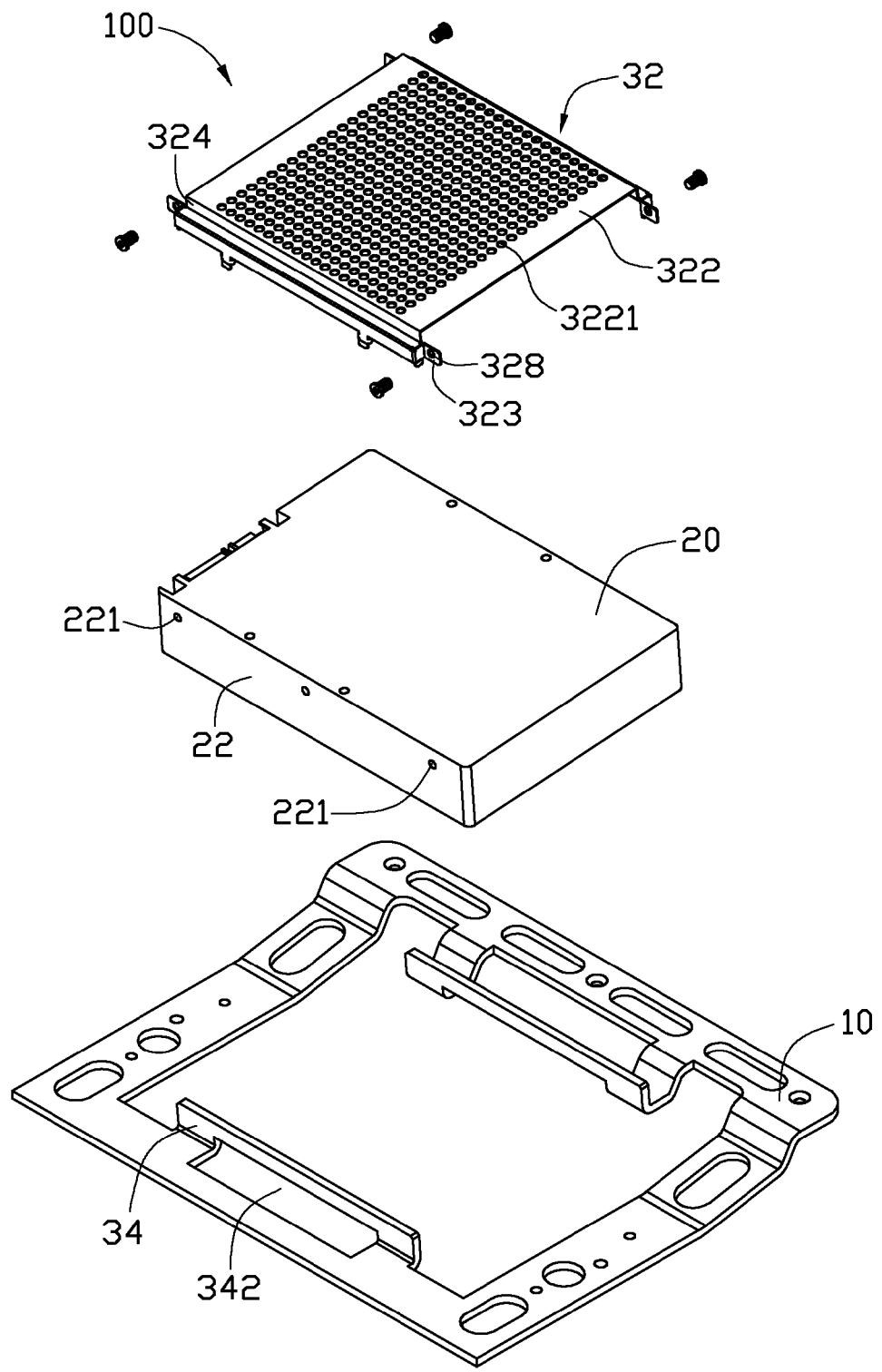
FIG. 3 is an exploded, isometric view of the fixing mechanism shown in FIG. 1.

Referring also to FIG. 3, in the illustrated embodiment, the storage device 20 is a hard-disk drive, substantially cubic, and including two positioning sides 22 opposite to each other. Each of the positioning sides 22 defines a pair of fixing holes 221. The two pairs of fixing holes 221 are opposite to each other.

Figure 2:
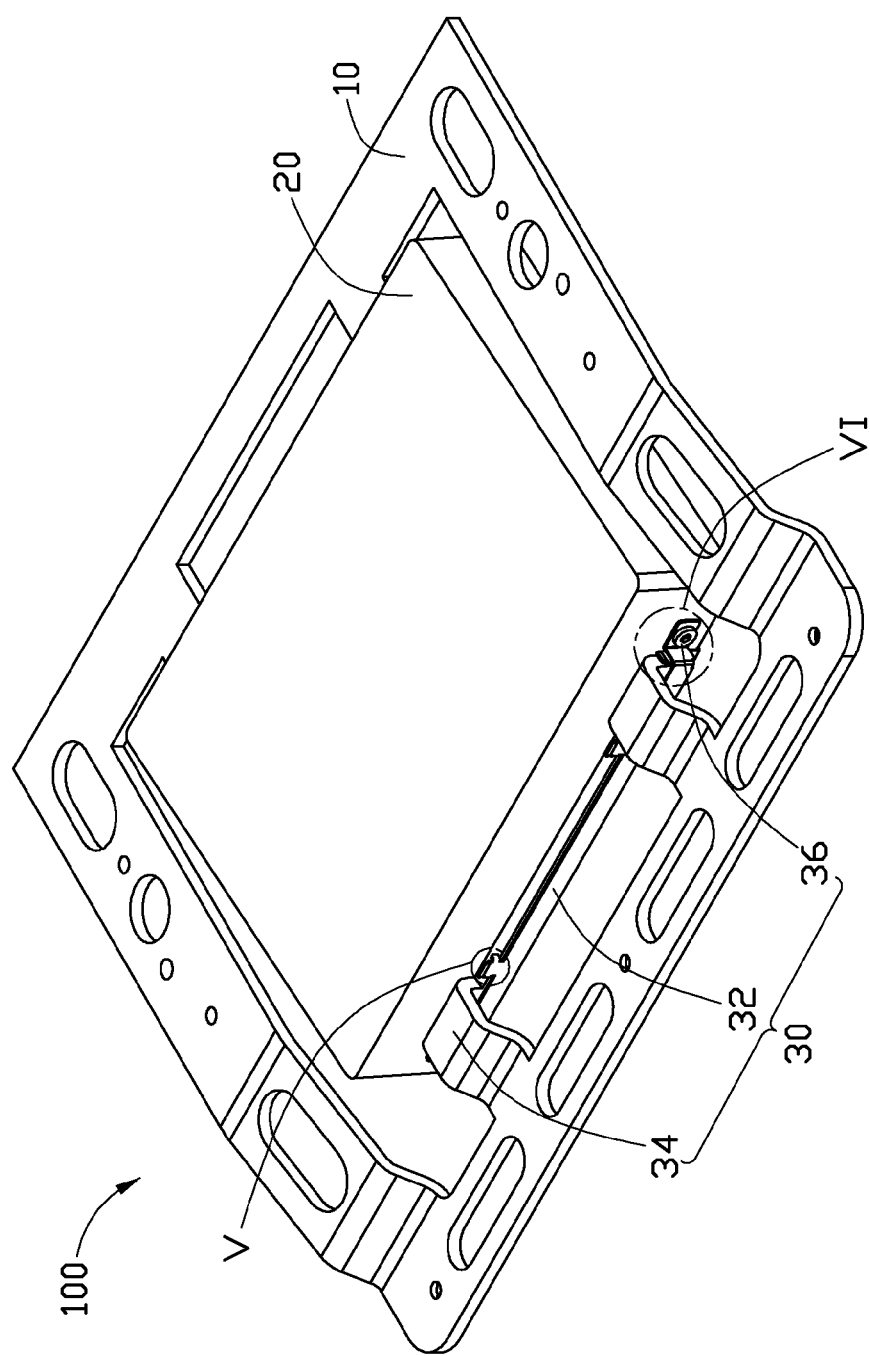
FIG. 2 is similar to FIG. 1, but viewed from another aspect.

Referring also to FIG. 2, the fixing mechanism 30 includes a limiting member 32, two latching members 34 extending upward from the bracket 10, and two pairs of fixing members 36 fixing the limiting member 32 to the storage device 20. The fixing members 36 can be, but are not limited to, screws. The two latching members 34 are opposite to each other.

Figure 4:
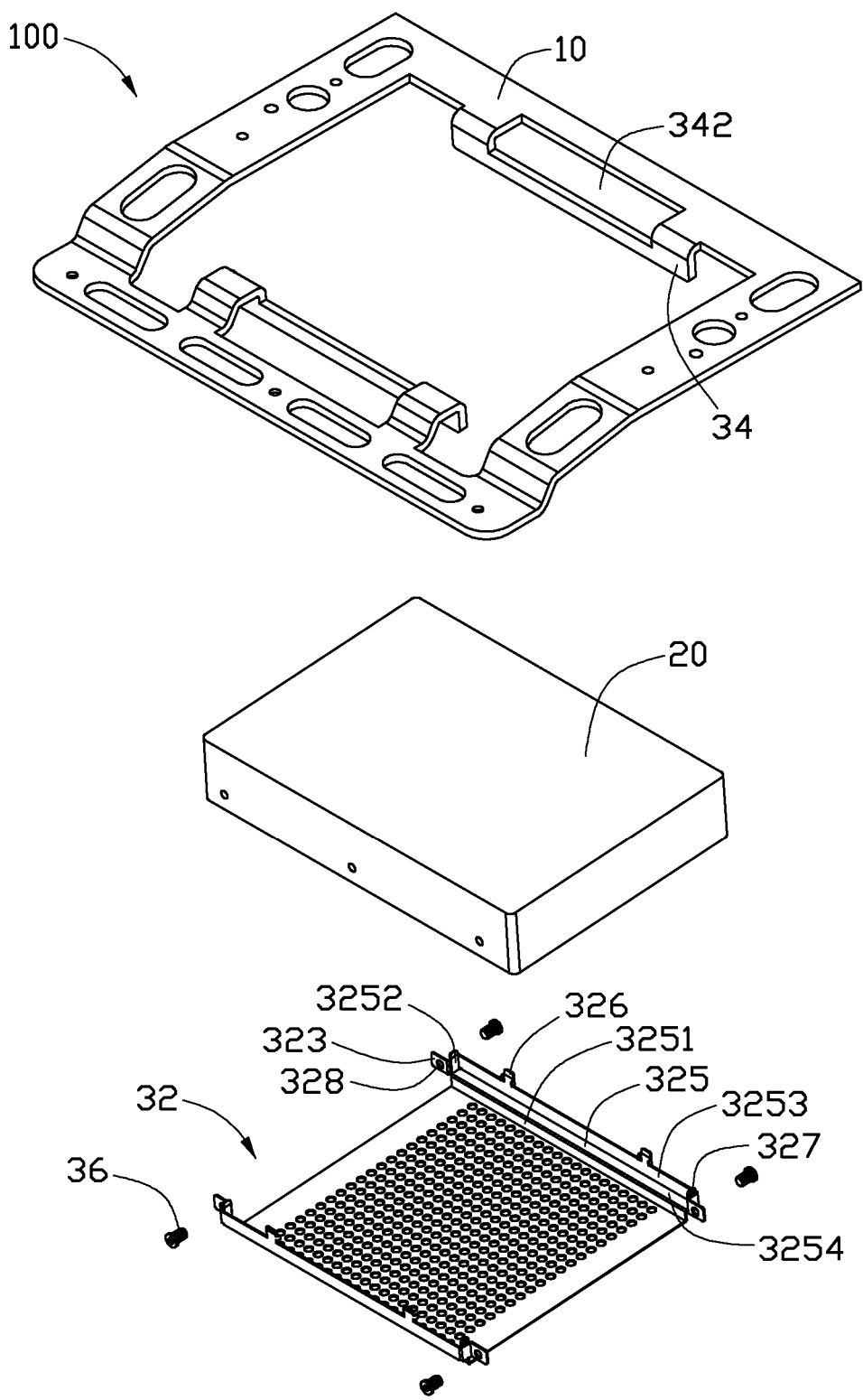
FIG. 4 is similar to FIG. 1, but viewed from another aspect.

Referring to FIGS. 3 and 4, the limiting member 32 is substantially U-shaped, and includes a main board 322 and a pair of side plates 324. The main board 322 may define a plurality of dissipating holes 3221 to allow heat to dissipate from the storage device 20. The pair of side plates 324 extends substantially perpendicularly from opposite edges of the main board 322. Each of the side plates 324 defines a holding portion 325 to receive the corresponding latching member 34. The holding portion 325 includes a bottom wall 3251, two first side walls 3252, and a second side wall 3253. The bottom wall 3251 is a substantially stepped structure defining a stepped surface 3254. Each of the first side walls 3252 extends substantially perpendicularly from opposite edges of the stepped surface 3254 of the bottom wall 3251. The second side wall 3253 extends substantially perpendicularly from the stepped surface 3254 and adjoins the two first side walls 3252.

Each of the side plates 324 further includes a pair of tabs 323, two resilient hooks 326 and two guiding sheets 327. Each of the tabs 323 extends from an edge of the first side wall 3252 adjacent to the bottom wall 3251, and defines a through hole 328. The two resilient hooks 326 extend from an edge of the second side wall 3253. Each of the guiding sheets 327 extends from an edge of the two first side wall 3252 away from the bottom wall 3251. The two pairs of fixing members 36 fix the storage device 20 via the corresponding through holes 328. The two guiding sheets 327 may easily guide the two latching members 34 to the corresponding holding portions 325.

Figure 5:
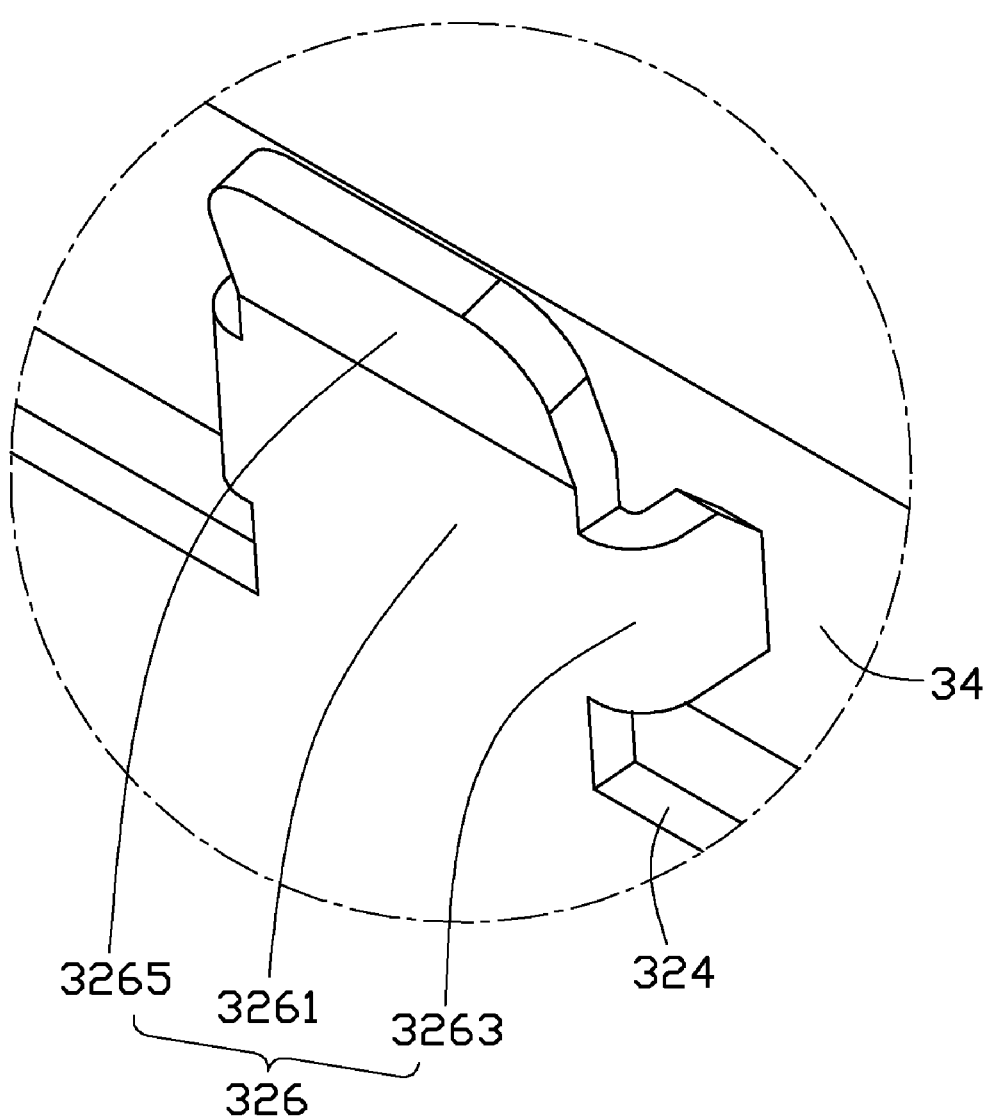
FIG. 5 is an enlarged view of circular part V of FIG. 2.
Figure 6:
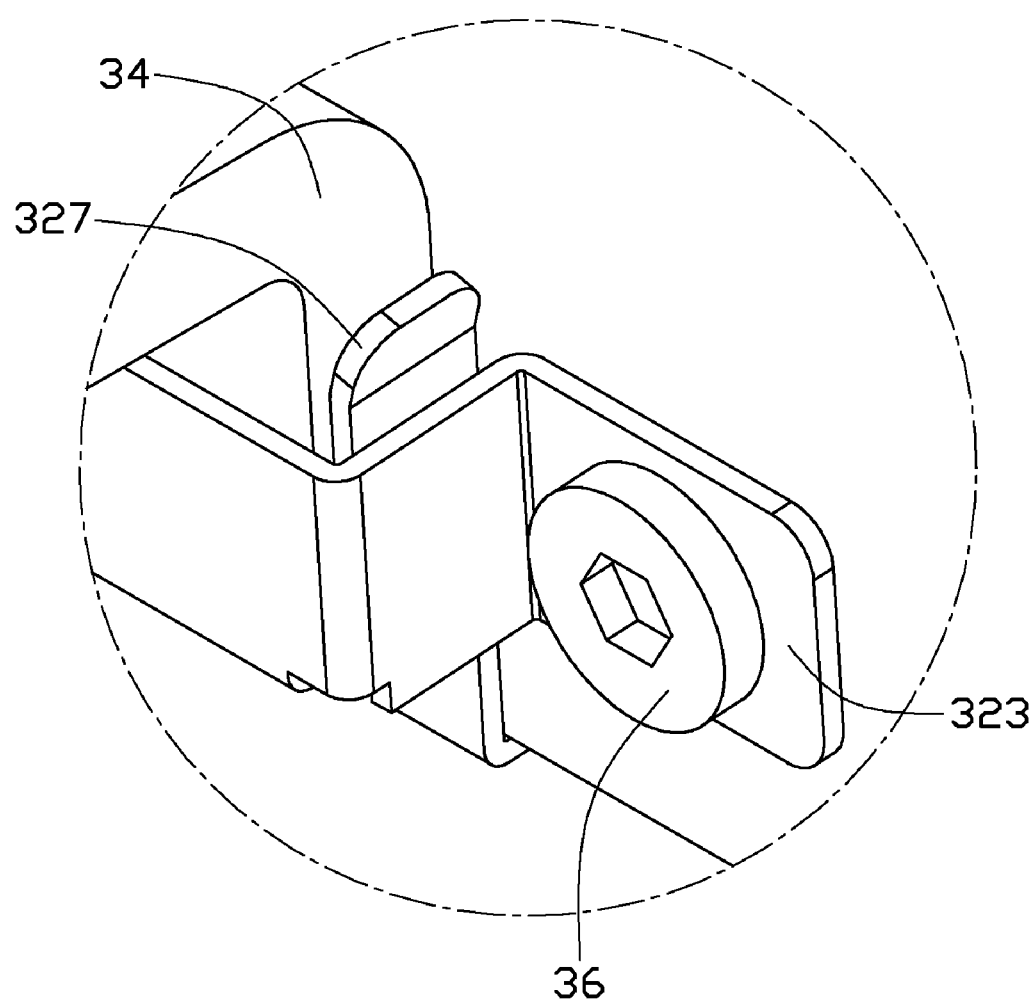
FIG. 6 is an enlarged view of circular part VI of FIG. 2.

Referring also to FIG. 5, in the illustrated embodiment, each of the resilient hooks 326 includes a sheet body 3261, a pair of hook portions 3263, and a mounting portion 3265. The pair of hook portions 3263 extends from opposite sides of the sheet body 3261 and bends toward the holding portion 325. The mounting portion 3265 extends from the free end of the sheet body 3261 and bends outward. The sheet body 3261 may be elastically deformed by applying an external force to the mounting portion 3265.

Each of the latching members 34 extends out substantially perpendicularly from the bracket 10, and defines a latching groove 342 in a middle portion of each of the latching members 34. The pair of hook portions 3263 of each resilient hook 326 engages in the latching grooves 342.

Referring to FIGS. 3 through 6, the storage device 20 is fixed to the bracket 10 as follows. The limiting member 32 is placed on the storage device 20. The two pairs of fixing members 36 pass through the through holes 328 of the limiting members 32, and engage with the corresponding fixing holes 221 of the storage device 20 to fix the storage device 20 between the pair of side plates 324 of the limiting member 32. The storage device 20 with the limiting member 32 is received in a space between the two latching members 34 by mounting the two latching members 34 in the corresponding holding portion 325 of the limiting member 32. The limiting member 32 is positioned to the bracket 10, such that the two hook portions 3263 of resilient hooks 326 engage with the latching groove 342 of the latching members 34. Thus, the storage device 20 is fixed to the bracket 10.

The storage device 20 can be detached from the bracket 10 as follows. The mounting portions 3265 of the resilient hooks 3263 are pressed away from the side plates 324, such that the sheet body 3261 of the resilient hooks 326 deforms to allow the hook portions of the resilient hooks 326 to detach from the latching members 34. The storage device 20 with the limiting member 32 is disassembled from the bracket 10. Both assembly and disassembly of the storage device 20 to the bracket 10 are thus simple and easily accomplished, and the structure of the fixing mechanism 30 relatively simple.

It should be pointed out that the number of fixing members 36 can be more than two, and the number of resilient hooks 326 can be one or more than two. The fixing member 36 can also be omitted, as long as the limiting member 32 is fixed to the bracket 10 such as by welding or by an adhesive. The latching member 34 can be an L-shaped hook to engage with the resilient hooks 326. The latching member 34 can also be fixed to the storage device 20, and the limiting member 32 fixed to the bracket 10.

Figure 7:
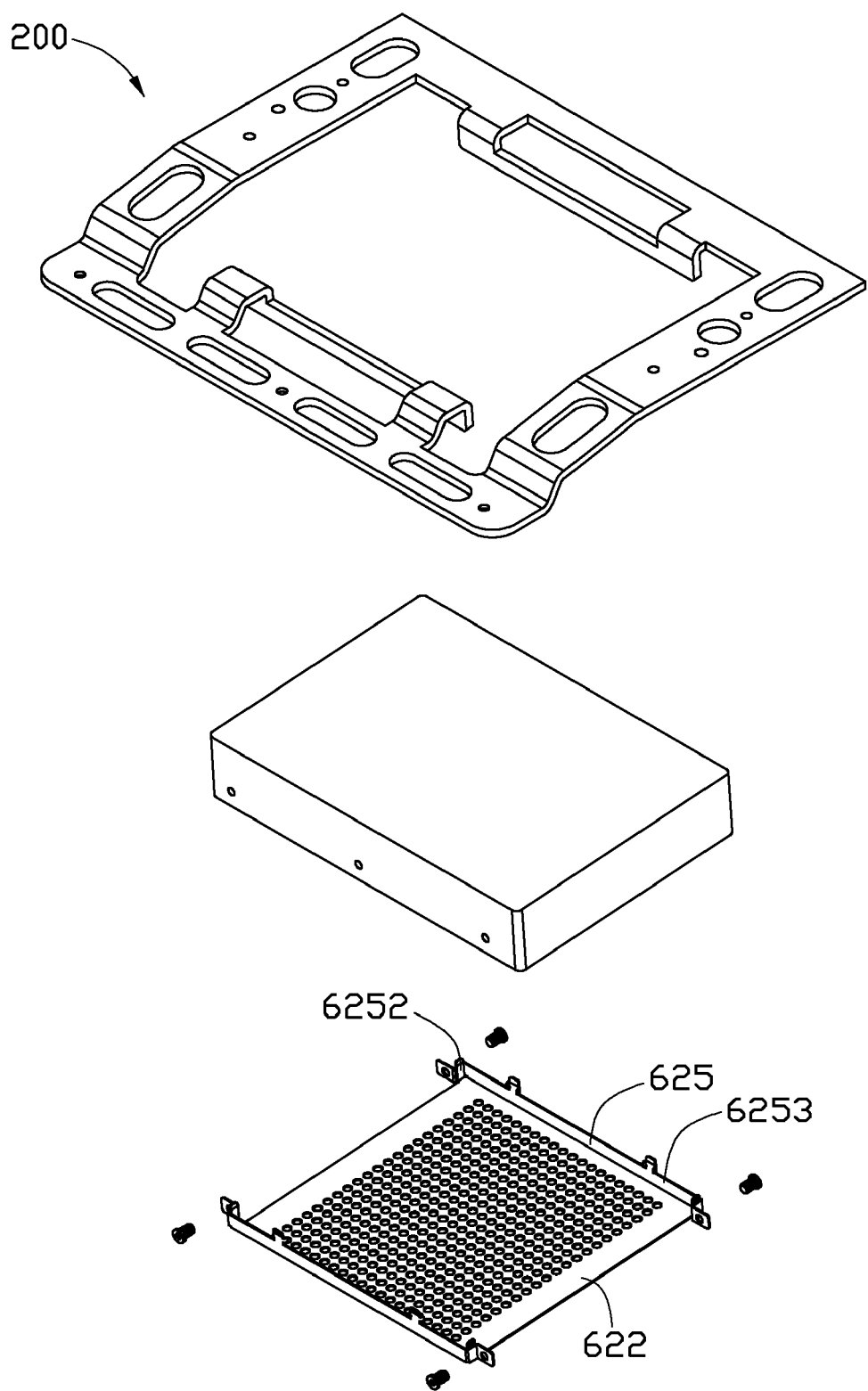
FIG. 7 is an isometric view of a second embodiment of the fixing mechanism.

Referring to FIG. 7, a second embodiment of an electronic device 200 is similar to the first embodiment of the electronic device 100, except that a holding portion 625 is different from the holding portion 325 in the first embodiment. Two third side walls 6252, a fourth side wall 6253, and a main board 622 cooperatively define the holding portion 625.

Figure 8:
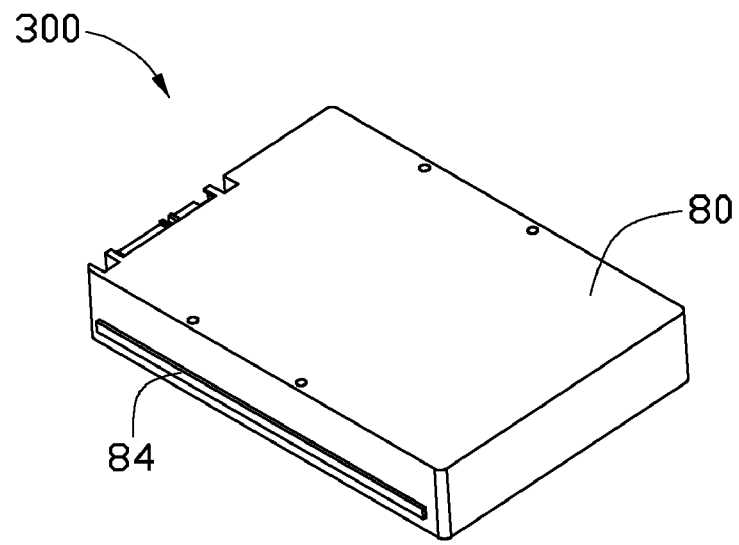
FIG. 8 is an isometric view of a third embodiment of the fixing mechanism.
Figure 8:
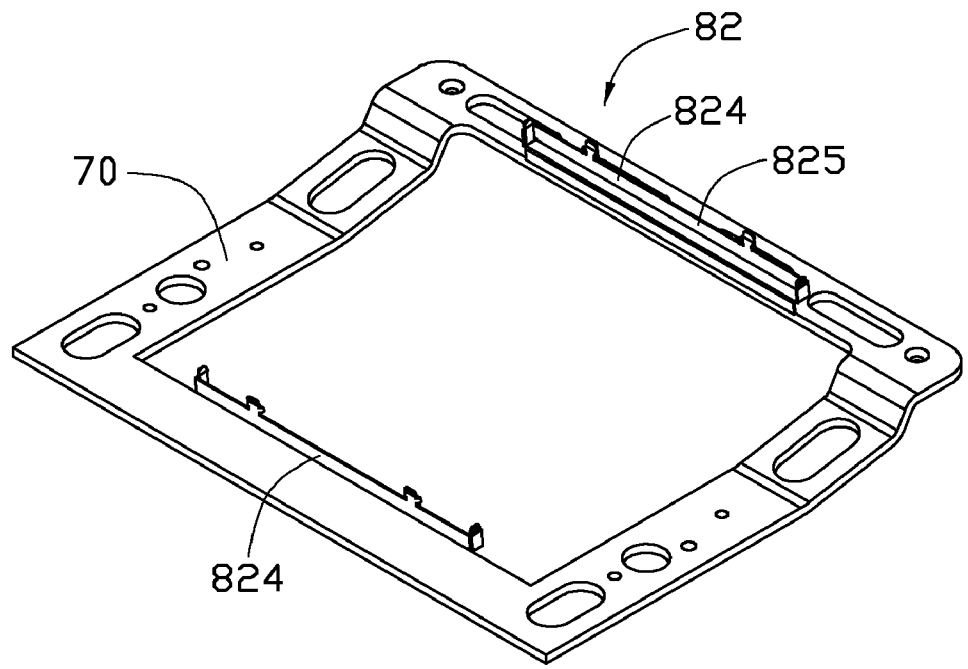

Referring to FIG. 8, a third embodiment of an electronic device 300 is similar to the first embodiment of the electronic device 100 in principle, except that the limiting member 82 and the latching members 84 are different from the limiting member 32 and the latching members 34 of the first embodiment. The limiting member 82 only includes opposite side plates 824 extending from the bracket 70. The two latching members 84 are fixedly disposed in opposite sides of the storage device 80. Each of the latching members 84 is a rib that can be received in the holding portion 825.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fixing mechanism fixing a storage device to an electronic device, the electronic device comprising a bracket, the fixing mechanism comprising:
   two latching members oppositely extending upward from the bracket and respectively positioned adjacent to two sides of the bracket, each latching member of the two latching members defining a latching groove in a middle portion thereof; and
   a substantially U-shaped limiting member fixed to the bracket and thereby forming a space together with the two latching members for receiving and securing the storage device, the limiting member comprising two side plates and at least one resilient hook extending from each of the two side plates, the each of the two side plates defining a holding portion to receive a corresponding latching member of the two latching members, the at least one resilient hook engaging with a corresponding latching groove of the two latching members;
   wherein the storage device is secured to, or detached from the bracket by the fixing mechanism depending on the resilient deformation or reformation of the at least one resilient hook along a direction perpendicular to the each of two side plates.

2. The fixing mechanism of claim 1, wherein the limiting member further comprises a main board, the two side plates extending substantially perpendicularly from opposite edges of the main board.

3. The fixing mechanism of claim 2, wherein the main board defines a plurality of dissipating holes to dissipate heat from the storage device.

4. The fixing mechanism of claim 2, wherein each of the holding portions comprises a bottom wall that is a substantially stepped structure defining a stepped surface, two first side walls extending substantially perpendicularly from opposite edge of the step surface, a second side wall adjoining the first side walls, and the at least one resilient hook extending from the second side wall.

5. The fixing mechanism of claim 4, wherein each of the two side plates further comprises two guiding sheets extending from an edge of the two first side walls away from the bottom wall.

6. The fixing mechanism of claim 4, further comprising two pairs of fixing members fixing the limiting member to the bracket, each of the side plates further comprising a pair of tabs defining two through holes, the storage device defining two pairs of fixing holes therein, the two pairs of fixing member passing through the through holes to engage with the fixing holes of the storage device.

7. The fixing mechanism of claim 4, wherein each of the at least one resilient hook comprises a sheet body, a pair of hook portions extending from opposite sides of the sheet body and bending toward the holding portion, and a mounting portion extending from the free end of the sheet body; the sheet body is deformed by applying an external force to the mounting portion; the hook portions engages with the latching groove of the latching member.

8. A fixing mechanism fixing a storage device to an electronic device, comprising:
   a bracket comprising two latching members oppositely and perpendicularly extending upward from two sides of the bracket and respectively positioned adjacent to the two sides of the bracket, each latching member of the two latching members defining a latching groove in a middle portion thereof; and
   a substantially U-shaped limiting member fixed to the storage device, and comprising two side plates and at least one resilient hook extending from each of the two side plates, the each of the two side plates defining a holding portion to receive a corresponding latching member of the two latching members, the at least one resilient hook engaging with one of the latching grooves of the two latching members, the limiting member and the two latching members cooperatively forming a space for receiving and securing the storage device;
   wherein the storage device is secured to, or detached from the bracket by the fixing mechanism depending on the resilient deformation or reformation of the at least one resilient hook along a direction perpendicular to the each of two side plates.

9. The fixing mechanism of claim 8, wherein the limiting member further comprises a main board, the two side plates extending substantially perpendicularly from opposite edges of the main board.

10. The fixing mechanism of claim 9, wherein the main board defines a plurality of dissipating holes to dissipate heat from the storage device.

11. The fixing mechanism of claim 9, wherein each of the holding portions comprises a bottom wall that is a substantially stepped structure defining a stepped surface, two first side walls extending substantially perpendicularly from opposite edge of the step surface, a second side wall adjoining the first side walls, and the at least one resilient hook extending from the second side wall.

12. The fixing mechanism of claim 11, wherein each of the side plates further comprises two guiding sheets extending from an edge of the two first side walls away from the bottom wall.

13. The fixing mechanism of claim 11, further comprising two pairs of fixing members fixing the limiting member to the bracket, each of the side plates further comprising a pair of tabs defining two through holes, the storage device defining two pairs of fixing holes therein, the two pairs of fixing member passing through the through holes to engage with the fixing holes of the storage device.

14. The fixing mechanism of claim 11, wherein the at least one resilient hook comprises a sheet body, a pair of hook portions extending from opposite sides of the sheet body and bending toward the holding portion, and a mounting portion extending from the free end of the sheet body; the sheet body is deformed by applying an external force to the mounting portion; the hook portions engages with the latching groove of the latching member.

* * * * *